United States Patent
Benevelli

(10) Patent No.: US 11,679,806 B2
(45) Date of Patent: Jun. 20, 2023

(54) REACTIVE STEERING SYSTEM FOR A WORK VEHICLE HAVING AN ARTICULATED CHASSIS

(71) Applicant: CNH Industrial America LLC, New Holland, PA (US)

(72) Inventor: Alessandro Benevelli, Albinea Reggio Nell''Emilia (IT)

(73) Assignee: CNH Industrial America LLC, New Holland, PA (US)

( * ) Notice: Subject to any disclaimer, the term of this patent is extended or adjusted under 35 U.S.C. 154(b) by 223 days.

(21) Appl. No.: 16/768,867

(22) PCT Filed: Nov. 30, 2018

(86) PCT No.: PCT/EP2018/083092
§ 371 (c)(1),
(2) Date: Jun. 1, 2020

(87) PCT Pub. No.: WO2019/106130
PCT Pub. Date: Jun. 6, 2019

(65) Prior Publication Data
US 2021/0163065 A1 Jun. 3, 2021

(30) Foreign Application Priority Data
Nov. 30, 2017 (IT) .......................... 102017000138280

(51) Int. Cl.
*B62D 12/00* (2006.01)
*B60K 17/02* (2006.01)
(Continued)

(52) U.S. Cl.
CPC .............. *B62D 12/00* (2013.01); *B60K 17/02* (2013.01); *B60K 17/30* (2013.01); *B60K 17/358* (2013.01);
(Continued)

(58) Field of Classification Search
CPC .......... B60K 6/387; B60K 6/26; B60K 6/405; B60K 6/48; F16D 13/24; F16D 25/0632; H02K 9/19
See application file for complete search history.

(56) References Cited

U.S. PATENT DOCUMENTS 4,071,108 A * 1/1978 Iida ........................ B62D 12/00
91/388
4,310,061 A 1/1982 Khanna et al.
(Continued)

FOREIGN PATENT DOCUMENTS

DE 102013112182 A1 5/2015
EP 2594828 A1 5/2013

OTHER PUBLICATIONS

International Search Report and Written Opinion for Application No. PCT/EP2018/083092 dated Feb. 12, 2019 (11 pages).

*Primary Examiner* — Minnah L Seoh
*Assistant Examiner* — Maurice L Williams
(74) *Attorney, Agent, or Firm* — Peter K. Zacharias

(57) ABSTRACT

A work vehicle including an articulated vehicle chassis having a front frame portion and a rear frame portion pivotally coupled together at a generally vertical pivot axis. The front frame portion carries a front axle and the rear frame portion carries a rear axle. A steering system includes at least one steering cylinder connected between the front frame portion and the rear frame portion. A power plant provides motive power to the work vehicle, and a transmission receives power from the power plant and provides power to the front axle and rear axle. The work vehicle further includes a secondary clutch interconnected between the transmission and the rear axle. The steering system is configured to disengage the secondary clutch to provide reactive steering, whereby the front frame portion tows the (Continued)

rear frame portion. The rear frame portion freely articulates relative to the front frame portion.

10 Claims, 2 Drawing Sheets

(51) Int. Cl.
  *B60K 17/34* (2006.01)
  *B60K 23/08* (2006.01)
  *B60K 17/30* (2006.01)
  *B62D 6/00* (2006.01)

(52) U.S. Cl.
  CPC ........ *B60K 23/08* (2013.01); *B60K 2023/085* (2013.01); *B62D 6/007* (2013.01)

(56) References Cited

U.S. PATENT DOCUMENTS

| | | | |
|---|---|---|---|
| 4,356,878 A | | 11/1982 | Kestian et al. |
| 5,180,028 A | * | 1/1993 | Perrenoud, Jr. .......... B60G 9/02 180/41 |
| 5,725,063 A | | 3/1998 | Ceragioli et al. |
| 2009/0032273 A1 | * | 2/2009 | Hahn ................... B62D 13/005 172/2 |
| 2011/0018230 A1 | * | 1/2011 | Roose ................... B62D 12/00 280/400 |
| 2013/0136624 A1 | * | 5/2013 | Kitao ................... F16H 61/444 417/212 |
| 2018/0015927 A1 | * | 1/2018 | Mitchell ............... B60W 10/20 |

* cited by examiner

REACTIVE STEERING SYSTEM FOR A WORK VEHICLE HAVING AN ARTICULATED CHASSIS

BACKGROUND OF THE INVENTION

The present invention relates to steering systems for a work vehicle, and, more specifically to reactive steering systems for a work vehicle.

Work vehicles can include agricultural, construction, industrial and forestry vehicles. Newer work vehicles can be steered using manual steering or auto-navigation, with the latter type of steering typically using some type of geospatial location data (such as GPS data) to locate the vehicle within a geographic area.

A work vehicle such as a wheeled loader can have a rigid frame for front axle steering, or an articulated frame for articulated steering. With articulated steering, typically the front frame portion rotates relative to the rear frame portion, and the front wheels do not steer relative to the front frame portion. Rather, one or more steering cylinders rotate the front frame portion relative to the rear frame portion.

Work vehicles can also be provided with two forms of steering, termed reactive and non-reactive steering. Reactive steering is more commonly used in Europe, while non-reactive steering is more commonly used in North America. Reactive steering is essentially the same as that used in road vehicles in which the driver can feel the steering and will notice a reaction from the road wheels if the vehicle drives over a bump or the wheels get stuck in a furrow. Non-reactive steering, on the other hand, can be used when towing an implement such as a plow. With non-reactive steering, the operator can set a desired direction and the vehicle will not deviate from this direction, even if obstructions are met by the wheels. A vehicle with non-reactive steering has no self-righting action and if the steerable wheels are set at an angle, the vehicle will continue to move indefinitely in a circle of constant radius. Non-reactive steering may be desirable under some operating conditions, while reactive steering may be desirable under other operating conditions.

Some work vehicles can be provided with both reactive and non-reactive steering. For example, U.S. Pat. No. 5,816,359, which is assigned to the assignee of the present invention, discloses a work vehicle having a steering system that can be switched between reactive and non-reactive steering. However, with articulated frame vehicles as described above, the vehicle architecture limits the steering to a non-reactive steering system.

SUMMARY OF THE INVENTION

The present invention provides an articulated frame work vehicle with reactive steering, whereby a clutch positioned ahead of the rear axle can be disengaged, the front axle tows the rear axle, and the rear frame portion can freely articulate relative to the front frame portion.

The invention in one form is directed to a work vehicle, including an articulated vehicle chassis including a front frame portion and a rear frame portion pivotally coupled together at a generally vertical pivot axis. The front frame portion carries a front axle and the rear frame portion carries a rear axle. A steering system includes at least one steering cylinder connected between the front frame portion and the rear frame portion. A power plant provides motive power to the work vehicle. A transmission receives power from the power plant. The work vehicle is characterized by a clutch interconnected between the transmission and the rear axle. The steering system is configured to disengage the clutch to provide the work vehicle with reactive steering, whereby the front frame portion tows the rear frame portion and the rear frame portion is generally free to articulate relative to the front frame portion about the pivot axis.

In another embodiment of the invention, a steering valve is fluidly coupled with the at least one steering cylinder and has a selective reactive steering mode and non-reactive steering mode. An electrical processing circuit can be configured to disengage the clutch and control the steering valve to place the steering valve in the reactive steering mode, thereby providing the work vehicle with the reactive steering.

In another embodiment of the invention, the steering system is configured to place the at least one steering cylinder in a float state allowing the rear frame portion to pivot relative to the front frame portion about the pivot axis.

In yet another embodiment of the invention, the front frame portion and the rear frame portion each have a longitudinal axis, and the disengagement of the secondary clutch allows the two longitudinal axes to substantially align with each other during the reactive steering.

In yet another embodiment of the invention, the steering system includes an electrical processing circuit which is configured to disengage the clutch to provide the work vehicle with the reactive steering.

In a further embodiment of the invention, the work vehicle further includes a primary clutch interconnected between the power plant and the transmission.

In a further embodiment of the invention, the work vehicle is a full-time four wheel drive vehicle with the transmission providing continuous output power to each of the front axle and the rear axle, and wherein the secondary clutch selectively interrupts the output power to the rear axle.

In a still further embodiment of the invention, the power plant comprises a diesel engine.

In another embodiment of the invention, the work vehicle is a wheeled loader.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
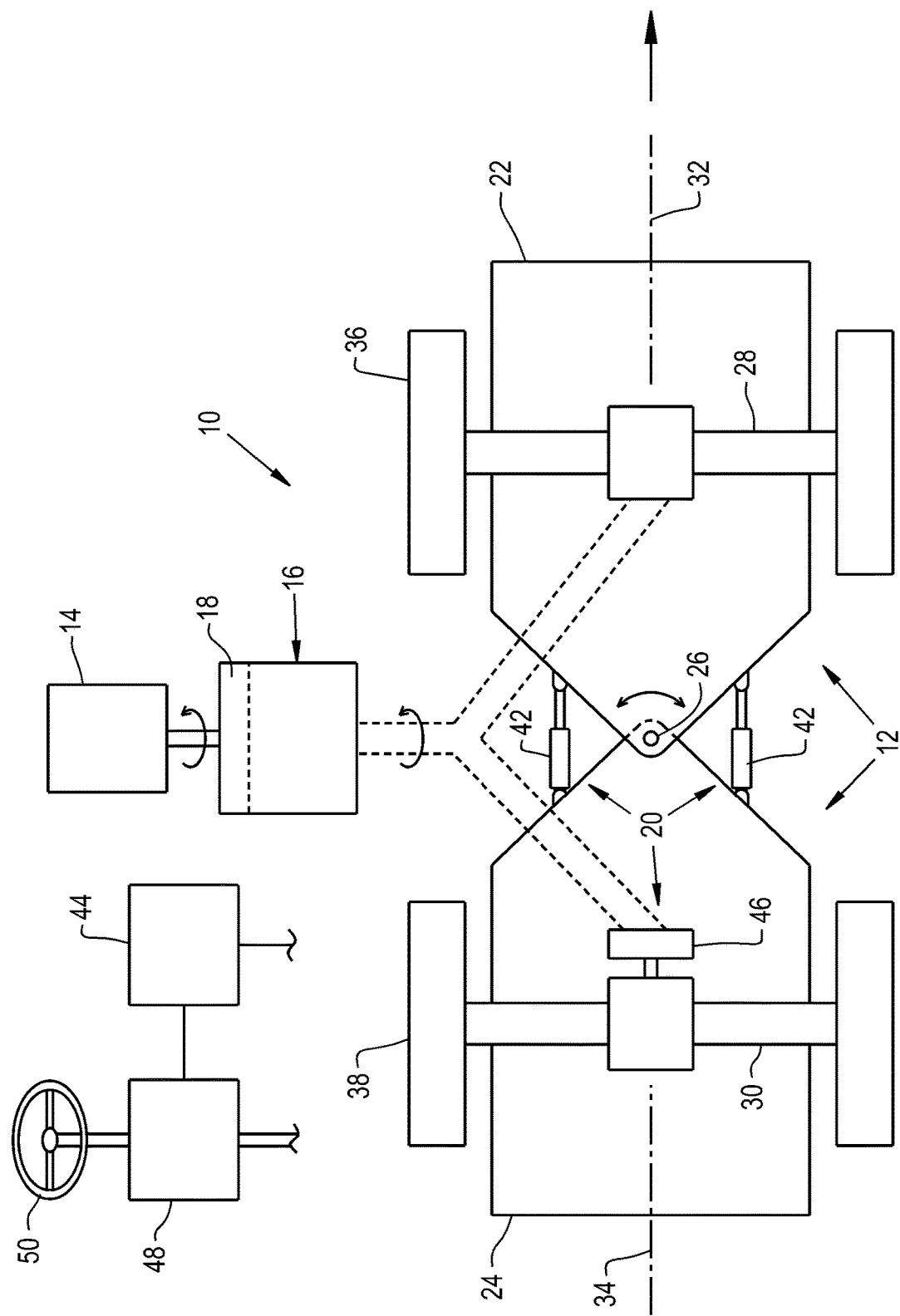
FIG. 1 is a schematic top view of an embodiment of a work vehicle including an embodiment of a reactive steering system of the present invention.
Figure 2:
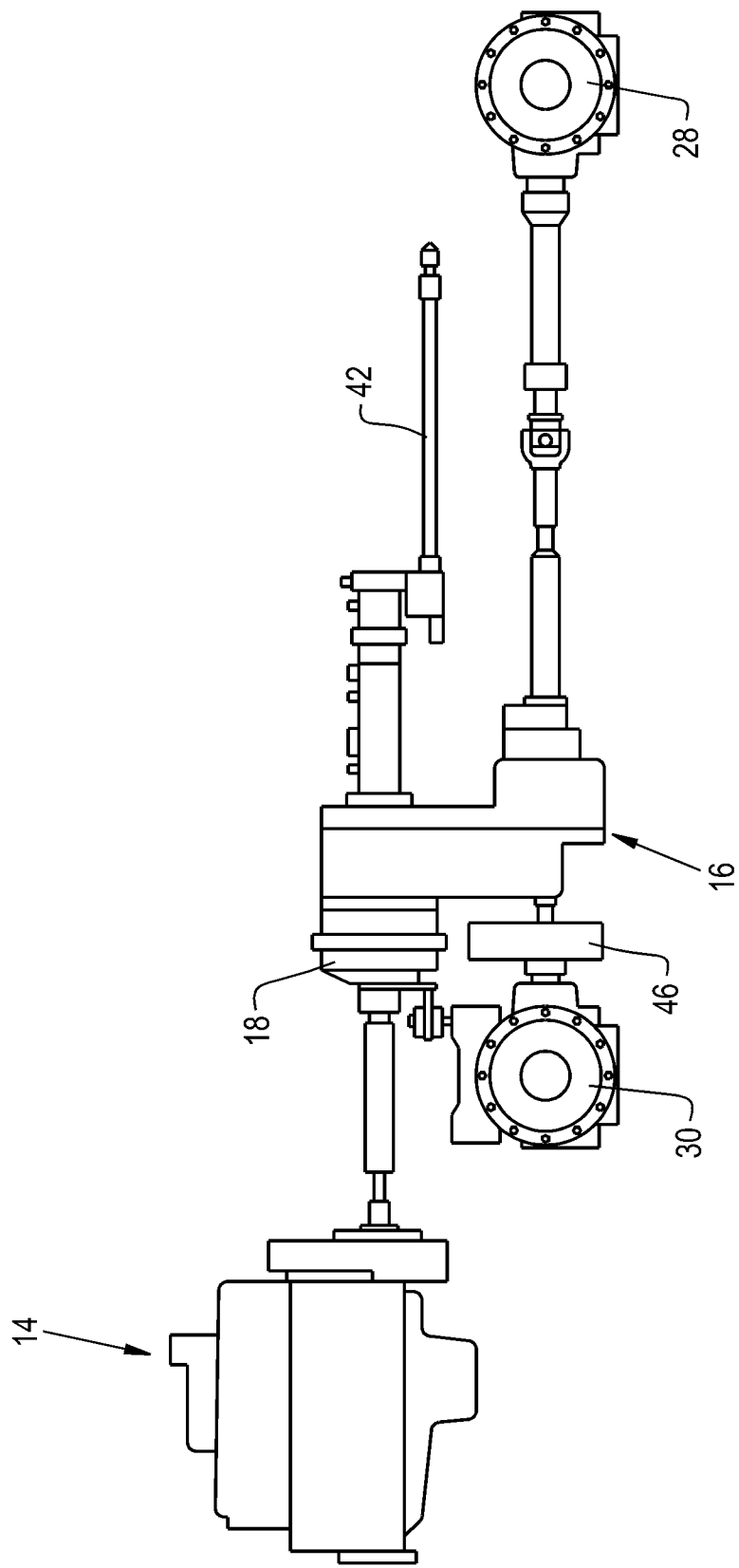
FIG. 2 is a side view of a portion of a work vehicle, showing the reactive steering system of FIG. 1.

Referring now to FIGS. 1 and 2, there is shown a portion of a work vehicle 10 which is assumed to be a wheeled loader in the illustrated embodiment. However, the work vehicle 10 could also be another type of work vehicle, such as a different type of agricultural, industrial, construction or forestry work vehicle.

The work vehicle 10 generally includes an articulated vehicle chassis 12, a power plant 14, a transmission 16, a primary clutch 18, and a steering system 20.

The articulated vehicle chassis 12 includes a front frame portion 22 and a rear frame portion 24 pivotally coupled together for articulated movement about a generally vertical pivot axis 26. The front frame portion 22 carries a front axle 28 and the rear frame portion 24 carries a rear axle 30. The front frame portion 22 and the rear frame portion 24 each have a respective longitudinal axis, 32 and 34, which define an articulation angle (not numbered) of the vehicle chassis 12. The articulated vehicle chassis 12 is of the type typically used on a full-time four wheel drive (4WD) vehicle with the transmission 16 providing continuous output power to each of the front axle 28 and the rear axle 30.

The front axle 28 carries a pair of outboard ground engaging members in the form of wheels 36, which are assumed to be at a fixed orientation relative to the front frame portion 22. Similarly, the rear axle 30 carries a pair of outboard ground engaging members in the form of wheels 38, which are also assumed to be at a fixed orientation relative to the rear frame portion 24. The work vehicle 10 can also be configured with a different type of ground engaging members, such as tracks or half tracks. The front axle 28 and rear axle 30 can include other known features, such as a differential, and the driveline can likewise include other known features, such as U-joints, etc.

The power plant 14 provides motive power to the work vehicle 10, and can also provide other types of power, such as electrical power, hydraulic power, etc. In the illustrated embodiment, the power plant 14 is in the form of an onboard internal combustion (IC) engine configured as a diesel engine providing better lug down, increased torque, etc. However, the power plant 14 can be differently configured, such as a gas engine, propane engine, electric generator set, etc.

Transmission 16 receives power from power plant 14 and provides power to the front axle 28 and rear axle 30. In the embodiment shown, the transmission 16 is configured as a geared transmission with an integral primary clutch 18 at the input side of the transmission to selectively engage/disengage power from the power plant 14. The primary clutch 18 can also be separate from but still on the input side of the transmission 16.

In another embodiment, not shown, the transmission 16 can be configured as a hydrostatic transmission with one or more pump(s), motor(s) and movable internal elements that effect different selective output speeds of the transmission. When configured as a hydrostatic transmission, it is typically not necessary to use a clutch at the input side of the transmission.

According to an aspect of the present invention, the steering system 20 can provide the articulated work vehicle 10 with selective reactive steering. This is in contrast with conventional articulated work vehicles which have non-reactive steering. The steering system 20 generally includes one or more steering cylinders 42, an electrical processing circuit 44, a clutch 46 and and a steering valve 48.

The one or more steering cylinders 42 interconnect between the front frame portion 22 and the rear frame portion 24. In the embodiment shown, the steering system includes a pair of hydraulic steering cylinders positioned on opposite sides of the pivot axis 26. The steering cylinders 42 are part of a hydraulic system that can be under the control of an electrical processing circuit 44, which can be configured as a digital and/or analog processor. In the illustrated embodiment, the electrical processing circuit 44 can be a digital controller, such as a Vehicle Control Unit (VCU). The VCU is shown with a fragmented wired connection to various components (such as a BUS, multi-wire cable, etc.); however, the VCU could also be coupled wirelessly to some or all components.

More specifically, the VCU 44 can be coupled with and control the steering valve 48 which is a hydraulic valve fluidly coupled with the steering cylinders 42 (represented by the fragmented fluid line extending from the steering valve 48). The steering valve 48 (also known as an "orbitrol") provides hydraulic steering with a selective reactive steering mode and non-reactive steering mode. The steering valve 48 is mechanically coupled with and receives input from a steering wheel 50, based on operator input by turning the steering wheel 50. A hydraulic steering orbitrol providing both reactive and non-reactive steering is known, and thus not described further herein.

The steering system 20 also includes a clutch 46 positioned between the transmission 16 and the rear axle 30. The clutch 46 can be disengaged to disengage the power to the rear axle 30 when it is desired to place the work vehicle 10 in a reactive steering mode. To that end, the clutch 46 can be configured as an electrically controllable clutch under the control of VCU 44.

The reactive steering mode can be desirable during road transport of the articulated chassis vehicle 10, while the non-reactive steering mode can be desirable during a field or work mode of the articulated chassis vehicle 10. The reactive steering mode can be effected automatically through appropriate sensor inputs, or can be manually input by an operator. When in the reactive steering mode, the VCU 44 can disengage the clutch 46 and and control the steering valve 48 to place the steering valve 48 in a reactive steering mode. When in the reactive steering mode, the steering valve 48 opens the hydraulic circuit between the two steering cylinders 42 and allows hydraulic fluid to flow back and forth therebetween. Power continues to be applied to the front axle 28, which then tows the rear axle 30. This towing action along with the disengagement of power to the rear axle and floating of the steering cylinders allows the rear frame portion 24 to follow behind and generally align with the front frame portion 22. This in turn causes the longitudinal axes 32 and 34 to substantially align with each other, thereby effecting the reactive steering of the work vehicle 10.

It may also be possible to provide electrical control of the steering cylinders 42 to place the steering system 20 in a reactive steering mode, rather than using the steering valve (orbitrol) 48. For example, it may be possible to use the VCU 44 to control other fluid valves (not shown, rather than an orbitrol) to place the steering cylinders in a "float mode" whereby oil is free to flow in either direction through the cylinders, thereby allowing the self-realigning between the front frame portion 22 and the rear frame portion 24. In this example, the VCU 44 would thus disengage the clutch 46 and place the steering cylinders 42 in a float mode during reactive steering.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A work vehicle, comprising:
   a front axle;
   a rear axle;
   an articulated vehicle chassis including a front frame portion and a rear frame portion pivotally coupled together at a generally vertical pivot axis, the front frame portion carrying the front axle and the rear frame portion carrying the rear axle;
   a steering system including at least one steering cylinder connected between the front frame portion and the rear frame portion;
   a power plant providing motive power;
   a transmission receiving power from the power plant and providing power to each of the front axle and the rear axle; and
   a clutch interconnected between the transmission and the rear axle,
   wherein the steering system is configured to disengage the clutch to disengage power from the transmission to the rear axle and to provide reactive steering, whereby the front frame portion tows the rear frame portion and the rear frame portion is generally free to pivot relative to the front frame portion about the pivot axis.

2. The work vehicle of claim 1, further comprising a steering valve which is fluidly coupled with the at least one steering cylinder and has a selective reactive steering mode and a non-reactive steering mode.

3. The work vehicle of claim 2, further comprising an electrical processing circuit which is configured to disengage the clutch and control the steering valve to place the steering valve in the reactive steering mode, thereby providing the reactive steering.

4. The work vehicle of claim 1, wherein the steering system is further configured to place the at least one steering cylinder in a float state, thereby allowing the rear frame portion to pivot relative to the front frame portion about the pivot axis.

5. The work vehicle of claim 1, wherein the front frame portion and the rear frame portion each have a longitudinal axis, and wherein disengagement of the clutch allows the longitudinal axes to substantially align with each other during the reactive steering.

6. The work vehicle of claim 1, further comprising an electrical processing circuit which is configured to disengage the clutch to provide the reactive steering.

7. The work vehicle of claim 1, further comprising a primary clutch interconnected between the power plant and the transmission.

8. The work vehicle of claim 1, wherein the work vehicle is a full-time four wheel drive vehicle with the transmission providing continuous output power to each of the front axle and the rear axle, and wherein the clutch selectively interrupts the output power to the rear axle.

9. The work vehicle of claim 1, wherein the power plant comprises a diesel engine.

10. The work vehicle of claim 1, wherein the work vehicle is a wheeled loader.

* * * * *